Aug. 21, 1951   E. S. SMITH   2,564,931
SNAP-ACTING CONTROL
Filed Feb. 17, 1947   2 Sheets-Sheet 1

Ezra S. Smith,
Inventor.
Haynes and Koenig,
Attorneys.

Aug. 21, 1951 — E. S. SMITH — 2,564,931
SNAP-ACTING CONTROL
Filed Feb. 17, 1947 — 2 Sheets-Sheet 2

Ezra S. Smith,
Inventor.
Haynes and Koenig
Attorneys.

Patented Aug. 21, 1951

2,564,931

UNITED STATES PATENT OFFICE 2,564,931

SNAP-ACTING CONTROL

Ezra S. Smith, Attleboro, Mass., assignor to Metals & Controls Corporation, Attleboro, Mass., a corporation of Massachusetts Application February 17, 1947, Serial No. 728,973
In Canada November 25, 1946

1 Claim. (Cl. 200—138)

This invention relates to snap-acting controls, and more particularly to snap-acting thermostatic switches.

Among the several objects of the invention may be noted the provision of improved snap-acting controls, particularly snap-acting thermostatic switches, having prolonged working life; the provision of controls of the class described wherein a snap-acting plate is attached to a support by welding in such manner as mechanically to reinforce the attachment and to avoid weld-induced weakness of the plate; and the provision of switches of this class wherein contacts are attached to a snap-acting thermostatic disc by welding in such manner as to avoid weakening of the attachment and early failure thereof. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which several of various possible embodiments of the invention are illustrated, Fig. 1 is a plan view of a prior-art control, illustrating fatigue failure thereof;

Similar reference characters indicate corresponding parts throughout the several views of the drawings.

Figure 1:
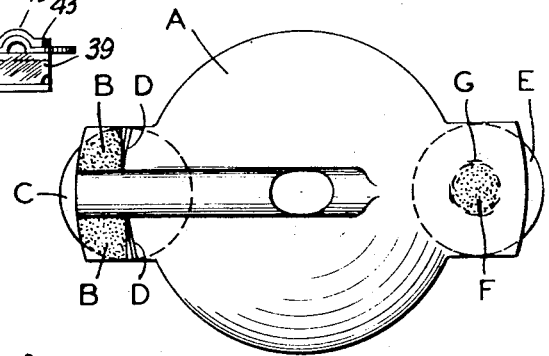

In my patent for Snap-Acting Plates, No. 2,487,684, issued November 8, 1949, of which this application is a continuation-in-part, there is disclosed a snap-acting control, more particularly a snap-acting thermostatic switch, wherein a ribbed snap-acting thermostatic disc is spot welded to a bendable supporting stud. I have found that the working life of such controls can be increased by means of the present invention. These controls often come to the end of their working life by cracking of the disc adjacent the margin of the welded area, where the disc is subjected to high bending stress in the course of its snapping from one dished configuration to the other. Referring to Fig. 1, which illustrates such a failure, there is shown at A a snap-acting disc of such a control spot welded over stippled areas B upon the head C of a bendable stud. The disc extends as a cantilever outward from the head C and is subjected to repeated reversals of bending stress in cycling. After a number of operating cycles of the disc, cracks D occur in the disc adjacent weld areas B, in the regions where the disc is subjected to such bending stress. These controls also are subject to failure by reason of cracking off of the contact E spot welded thereon. Referring again to Fig. 1, this contact is welded to the disc over stippled area F. Failure occurs by cracking of the disc in the generally annular area surrounding the weld area F, as illustrated at G. This invention involves improved forms of welded joints for securing the disc to its support and the contact to the disc which eliminate the above described failures and result in snap-acting controls having greatly increased working life.

Referring now to Figs. 2-5, reference character 1 indicates a dished, resilient, snap-acting plate formed of composite thermostatic bimetal and adapted to snap from one configuration (Fig. 2) to an opposite configuration (Fig. 5) upon temperature change. The plate comprises a circular disc 3 having a mounting ear 5 projecting radially outward on one side and another ear 7 projecting radially outward on the diametrically opposite side. Ear 5 provides means for conveniently mounting the plate as a cantilever on an adjustable supporting stud, as will be described. A contact element 9 is affixed as by welding on the underside of ear 7. The disc 3 is preferably provided with a central aperture 11.

Extending from the outer end of the mounting ear 5 to the central aperture is a stiffening deformation in the form of a radial, raised reinforcing rib 13. This rib radially stiffens the disc to minimize flexing of that portion of the disc between the mounting ear 5 and the central aperture in the radial plane through said rib and ear. The disc is also formed with another stiffening deformation in the form of a short, raised, reinforcing rib 15 extending radially outward from the aperture, preferably in alignment with and in extension of rib 13 beyond the center of the disc. Rib 15 is preferably of substantially lesser length than the radius of the disc. It is believed that this rib 15 provides means for stiffening the disc to minimize creeping flexing of that portion of the disc between the central aperture and the ear 9 in the radial plane through said rib and ear.

This snap-acting plate is identical to that disclosed in my aforesaid patent and has all the advantages described therein.

Figure 2:
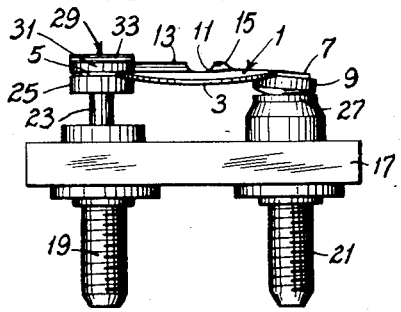
Fig. 2 is a side elevation of a thermostatic switch of this invention with its contacts closed.
Figure 3:
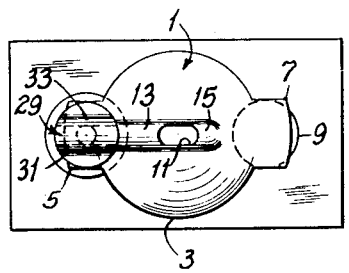
Fig. 3 is a plan view of the switch of Fig. 2.
Figure 4:
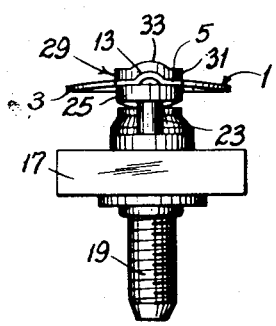
Fig. 4 is a left-end elevation of Fig. 2.
Figure 5:
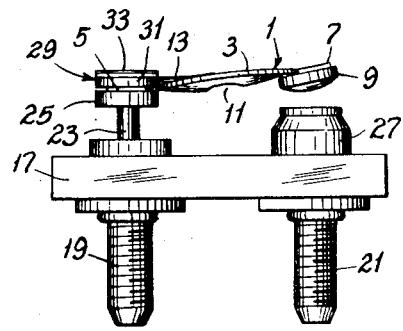
Fig. 5 is a view similar to Fig. 2 with the switch contacts open.

The snap-acting plate 1 is employed as the moving contact member in a thermostatic switch including a base 17 of electrical insulating material, such as Bakelite or Micarta. Metal studs 19 and 21 are fixed in the base adjacent its ends, as by riveting or the like. These studs project from the top and bottom of the base and their lower ends are threaded to serve as connecting terminals. Stud 19 serves as a support for the plate. The upper end of this stud is made adjustable by being formed with a stem 23 of reduced cross section, readily capable of being bent upon application of a reasonable amount of force thereto by a suitable tool. Stud 19 has a fat head or table 25. A contact 27, which is the fi ed contact of the switch, is secured on the upper end of stud 21. The snap-acting plate is mounted on the stud head 25 by spot welding in a particular manner to be described. The relative heights of the head 25 and the upper end of stud 21 above the base are preferably so related that, when plate 1 is welded to the head, contact 9 is just touching the contact 27 as shown in Fig. 2.

In welding the snap-acting plate to the head 25, a metallic welding cap or slug 29 is simultaneously affixed by welding over the ear 5 of the plate. As illustrated, this welding cap comprises a generally circular disc 31 corresponding in peripheral outline to the head 25, and formed with a rib 33 providing a channel wherein the rib 13 of the snap-acting plate 1 is received. In the operation of attaching the welding cap 29, the ear 5, and the head 25, the ear is disposed upon the head and the cap is disposed upon the ear with rib 13 received within rib 33. Welding electrodes are then brought into pressure engagement with the cap 29 and the lower end of stud 19 to pass welding current through the cap, ear and head simultaneously to spot weld the cap to the ear and the ear to the head. It is important that these elements be simultaneously spot welded to attain the desired results, rather than, for example, welding the ear 5 to head 25 and then welding the cap over the ear.

In this type of thermostatic switch, the snap-acting plate 1 forms an electrical resistance element for self-heating of the switch. When a current above a predetermined value passes through the plate, it is heated to its snapping temperature and snaps from the closed-contact position of Fig. 2 to the open-contact position of Fig. 5. This breaks the circuit, the plate cools down and snaps back to the Fig. 2 position. The above-described thermostatic switch of this invention, including the welding cap 29, is adapted to repeat this operating cycle many more times than the prior switch without a welding cap without cracking failure.

This ability of the control device of this invention to withstand fatigue is attributable to two factors: First, the welding cap 29 functions mechanically to reinforce the snap-acting plate in the regions thereof where it is subjected to high bending stresses in snapping from one configuration to the other, these regions being confined between the head 25 of stud 19 and the cap. Second, the welding cap 29 functions during the welding operation to prevent overheating of the snap-acting plate 1, and thus may prevent the portions of the plate 1 adjacent the weld from becoming brittle. Thus, the welding cap has the dual purpose of eliminating weld-induced weakness in the snap-acting plate and of mechanically reinforcing the plate, so that the working life thereof is much prolonged.

Figure 6:
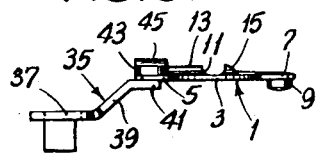
Fig. 6 is a side elevation of another embodiment of the invention.
Figure 7:
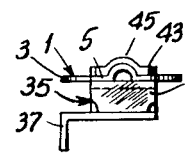
Fig. 7 is a left-end elevation of Fig. 6.
Figure 8:
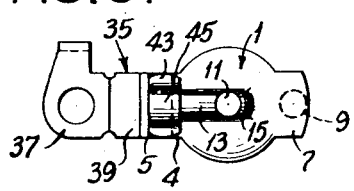
Fig. 8 is a plan view of the embodiment of Fig. 6.

Figs. 6–8 illustrate an alternative embodiment of the invention wherein the snap-acting plate 1 of the embodiment of Figs. 2–5 is mounted upon a modified support and the welding cap is modified to suit the support. The support in this embodiment comprises a steel bracket 35 having a mounting portion 37 by means of which it is mounted on a suitable base, an angularly extending bendable arm 39 (corresponding to stem 23) and a table or head portion 41 to which the ear 5 of the plate 1 is secured. The welding cap 43 in this embodiment is generally rectangular, and is formed with a rib 45 for receiving rib 13 of the plate. The cap, ear 5 and head portion 41 of the supporting bracket are spot welded in the same manner as described in conjunction with Figs. 2–5.

Figure 9:
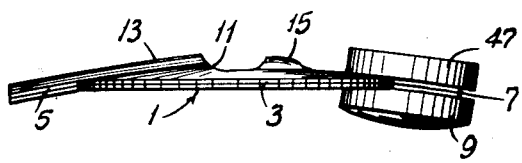
Fig. 9 is a side elevation of a snap-acting thermostatic disc for a switch, illustrating the improved manner of attaching a contact.

While I have illustrated in Figs. 2–8 a dished, snap-acting, double-rib thermostatic disc of the type shown in my aforesaid Patent No. 2,487,684 as being the preferred form of disc, it will be understood that the invention is equally applicable to a control device embodying the "dimpled" disc shown in Figs. 7–9 of that patent. It is also applicable to a control device embodying the single-rib disc of my copending application for Snap-Acting Plate, Serial No. 642,269, filed January 19, 1946, now abandoned.

Figure 10:
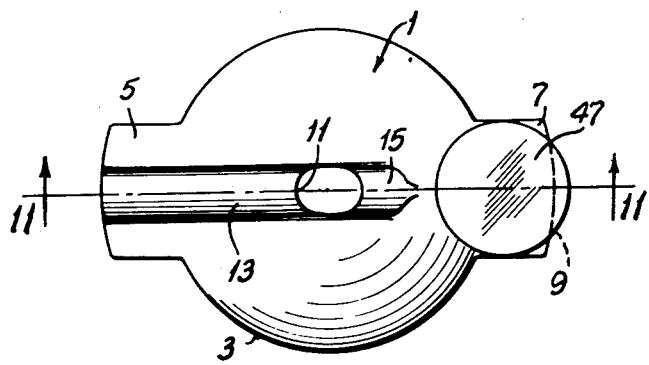
Fig. 10 is a plan view of the disc of Fig. 9.
Figure 11:
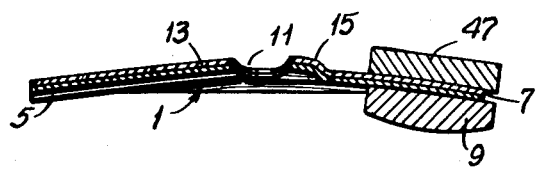
Fig. 11 is a section taken on line 11—11 of Fig. 10.

Figs. 9–11 illustrate a snap-acting plate 1 corresponding in all respects to that of Figs. 2–5 with the addition of a welding cap or slug 47 on the ear 7 of the plate directly over the contact 9. In forming this plate, the contact 9 is engaged against the underside of the ear 7 and the welding cap, which is simply a metallic disc, is engaged against the upper surface of the ear 7. Welding electrodes are then brought into engagement with contact 9 and cap 47 to pass welding current through the cap, ear and contact simultaneously to spot weld these elements together. The welding cap probably functions to prevent overheating of the plate 1 adjacent the weld area and thus prevents these portions from becoming brittle and cracking under the strains to which they are subjected when the plate snaps contact 9 against fixed contact 27.

Figure 12:
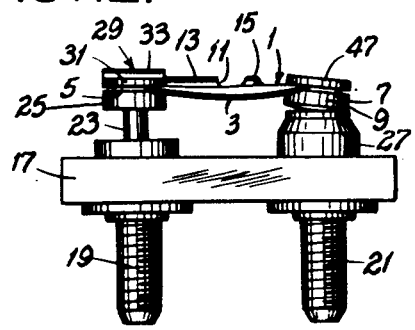
Fig. 12 is a side elevation on a reduced scale of a thermostatic switch similar to that of Fig. 2 and embodying the snap-acting disc of Figs. 9-11.

Thus, the provision of welding cap 47 prevents cracking off of contact 9 which might result from fatigue and prolongs the life of a thermostatic switch in which the plate of Figs. 9–11 is used. Fig. 12 illustrates such a switch. This switch is in all respects like that in Figs. 2–5 with the addition of the welding cap 47 on the upper surface of ear 7 directly above the contact 9.

All the welding caps herein disclosed are preferably formed of Monel metal for resistance to corrosion. This is preferable to the use of contacts with a corrosion-resistant electroplating, since such electroplating tends to become removed by overheating during the welding operation. If corrosion is not objectionable, the welding caps may be made of steel.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

A thermostatic switch comprising a supporting bracket having a mounting portion, an angularly extending bendable arm and a head, a dished, resilient, snap-acting thermostatic disc having a mounting ear projecting radially outward therefrom disposed on said head and a second ear diametrically opposite said mounting ear, a contact carried by said second ear for cooperation with a fixed contact, said disc having a raised reinforcing rib extending inward from the outer edge of said mounting ear, and a metallic cap having a peripheral outline corresponding substantially to that of said head and having a raised channel therein receiving said rib disposed on said mounting ear, said cap, mounting ear and head being integrally united by spot welding.

EZRA S. SMITH.

REFERENCES CITED

The following references are of record in the file of this patent:

UNITED STATES PATENTS

| Number | Name | Date |
| --- | --- | --- |
| 979,970 | Lachman | Dec. 27, 1910 |
| 1,987,662 | Bletz | Jan. 15, 1935 |
| 2,305,397 | Watter | Dec. 15, 1942 |
| 2,317,830 | Vaughan | Apr. 27, 1943 |
| 2,317,831 | Vaughan et al. | Apr. 27, 1943 |
| 2,340,615 | Rath | Feb. 1, 1944 |
| 2,369,616 | Spahn | Feb. 13, 1945 |
| 2,487,683 | Wilson | Nov. 8, 1949 |